(12) United States Patent
Cooper et al.

(10) Patent No.: US 10,765,205 B2
(45) Date of Patent: Sep. 8, 2020

(54) SHELVING SYSTEM AND BRACKET

(71) Applicants: David James Cooper, Carlisle (AU); Joo Ho Duane Wee, Carlisle (AU)

(72) Inventors: David James Cooper, Carlisle (AU); Joo Ho Duane Wee, Carlisle (AU)

( * ) Notice: Subject to any disclaimer, the term of this patent is extended or adjusted under 35 U.S.C. 154(b) by 0 days.

(21) Appl. No.: 16/324,120

(22) PCT Filed: Aug. 7, 2017

(86) PCT No.: PCT/AU2017/050830
§ 371 (c)(1),
(2) Date: Feb. 7, 2019

(87) PCT Pub. No.: WO2018/027263
PCT Pub. Date: Feb. 15, 2018

(65) Prior Publication Data
US 2019/0216216 A1    Jul. 18, 2019

Related U.S. Application Data

(63) Continuation of application No. PCT/AU2017/050830, filed on Aug. 7, 2017.

(30) Foreign Application Priority Data

Aug. 9, 2016  (AU) .............................. 2016903131

(51) Int. Cl.
*A47G 29/02*     (2006.01)
*A47B 57/34*     (2006.01)
(Continued)

(52) U.S. Cl.
CPC .......... *A47B 57/34* (2013.01); *A47B 47/0083* (2013.01); *A47B 47/045* (2013.01); *A47B 57/26* (2013.01); *A47B 57/54* (2013.01); *A47B 96/06* (2013.01); *A47B 96/061* (2013.01); *F16B 2/02* (2013.01); *F16B 9/02* (2013.01);
(Continued)

(58) Field of Classification Search
CPC ..... A47B 7/34; A47B 47/0083; A47B 47/045; A47B 57/26; A47B 57/54; F16B 2/02; F16B 9/02; F16B 12/20; F16B 12/32
USPC .............. 248/235; 211/90.01, 134, 153, 135; 108/59; 312/334.4, 351
See application file for complete search history.

(56) References Cited

U.S. PATENT DOCUMENTS

| 3,640,498 A * | 2/1972 | Aleks ...................... A47B 57/54 248/218.4 |
| 8,960,822 B1 * | 2/2015 | Hsu ........................ A47B 96/00 312/334.4 |

(Continued)

*Primary Examiner* — Todd M Epps
(74) *Attorney, Agent, or Firm* — Tope-McKay & Associates

(57) ABSTRACT

A shelving system (11) and a bracket (10) for a shelving system comprising, the bracket (10) comprising a first end portion (19), an intermediate portion (18) and second end portion (20). The intermediate portion (18) comprises a flexible wall portion being moveable from an open position, in which the flexile wall portion is planar, to a closed position, in which the flexible wall portion is arcuate. In the closed position, the flexible wall portion can wrap around a portion of a post (14) and the first and second end portions (19, 20) engage to form a connector (32) engageable with an end of a rail (16) for supporting drawers.

26 Claims, 14 Drawing Sheets

(51) Int. Cl.
*A47B 96/06* (2006.01)
*F16B 9/02* (2006.01)
*A47B 57/26* (2006.01)
*A47B 57/54* (2006.01)
*A47B 47/04* (2006.01)
*A47B 47/00* (2006.01)
*F16B 2/02* (2006.01)
*F16B 12/20* (2006.01)
*F16B 12/32* (2006.01)
*A47B 88/40* (2017.01)

(52) U.S. Cl.
CPC .............. *F16B 12/20* (2013.01); *F16B 12/32* (2013.01); *A47B 2088/401* (2017.01)

(56) References Cited

U.S. PATENT DOCUMENTS

| | | | |
|---|---|---|---|
| 10,058,174 B1* | 8/2018 | Tang | A47B 57/545 |
| 2003/0131767 A1* | 7/2003 | Chen | A47B 57/265 |
| | | | 108/147.13 |
| 2019/0343277 A1* | 11/2019 | Sabounjian | A47B 57/265 |

* cited by examiner

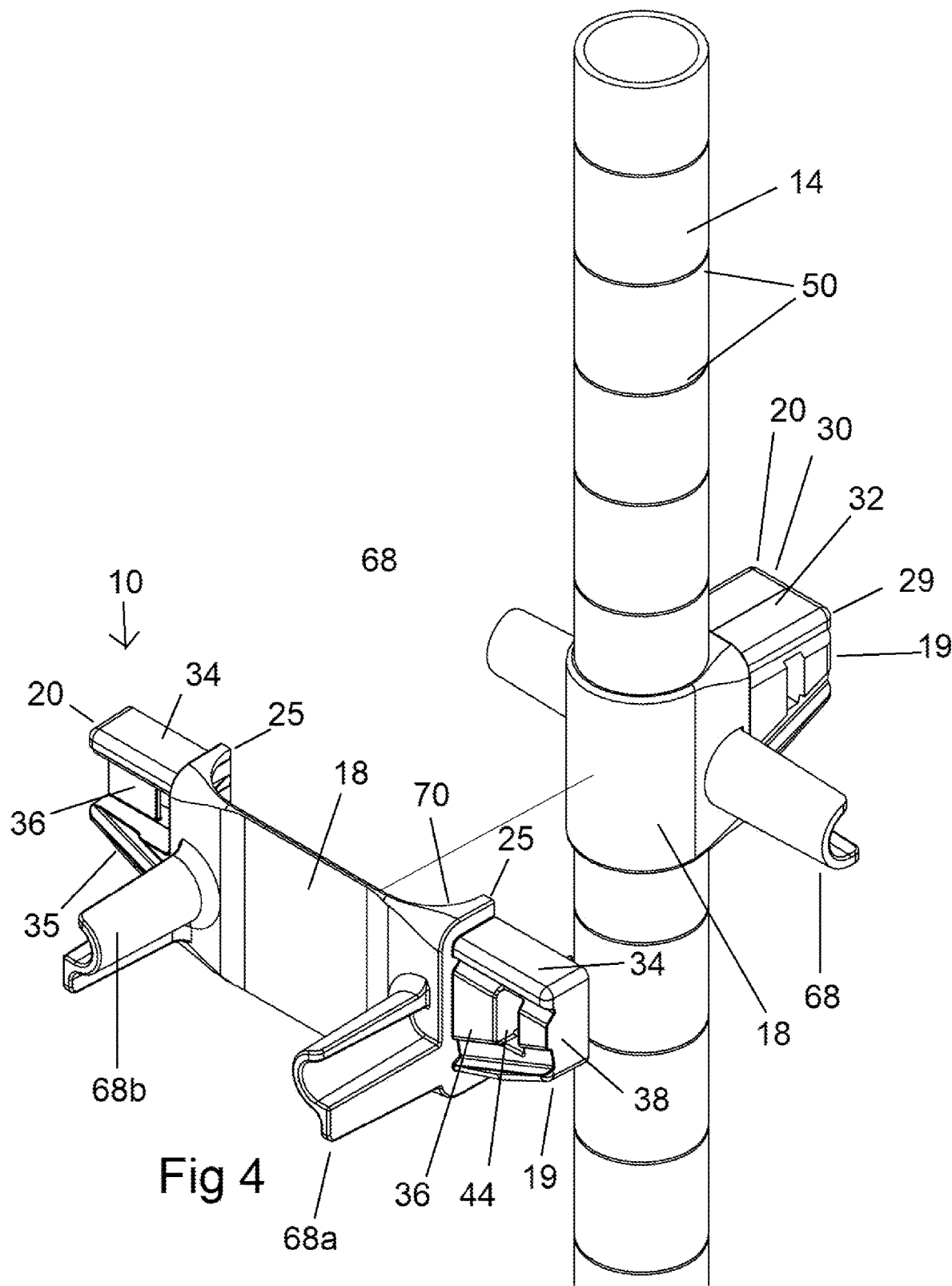

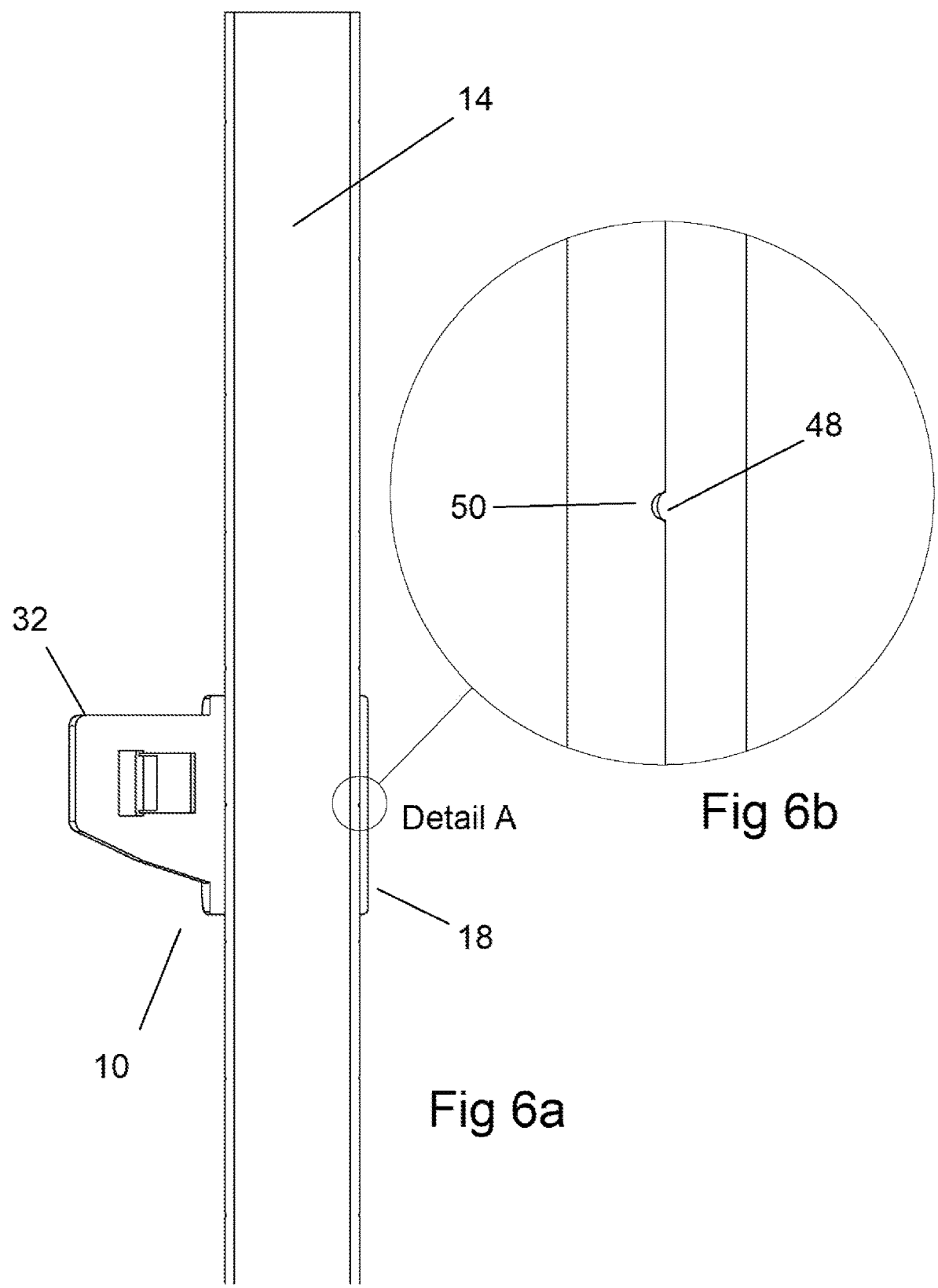

Detail B

SHELVING SYSTEM AND BRACKET

FIELD OF THE INVENTION

The present invention relates to a shelving system and a bracket for supporting drawers

BACKGROUND TO THE INVENTION

A range of modular systems are available for creating shelving racks of various sizes. One known system, often used in the health industry, comprises tubular corner posts which are received in cylinders provided on the corners of wireframe shelving units. The shelving unit is assembled by sliding an appropriate number of shelves onto the corner posts.

It is common for such shelving systems to require either shelves, drawers or a combination of the two. Existing shelving systems provide limited flexibility for both providing various configurations of these combinations and modifying the configuration as requirements change.

The present invention relates to a shelving system and a bracket for supporting drawers aimed at allowing easy attachment to the shelving system frame and simple reconfiguration.

SUMMARY OF THE INVENTION

According to one aspect of the present invention there is provided a shelving system comprising:
a frame comprising a plurality of posts;
a plurality of rails for supporting sides of drawers such that the drawers are slidable along the rails; and
brackets each comprising a first end portion, an intermediate portion and second end portion, the first end portion being located at a first end of the intermediate portion and the second end portion being located at a second opposite end of the intermediate portion;
wherein the intermediate portion comprises a flexible wall portion being moveable from an open position, in which the flexile wall portion is planar, to a closed position, in which the flexible wall portion is arcuate, such that in the closed position the flexible wall portion wraps around a portion of the post and the first and second end portions engage to form a connector engagable with an end of one of the rails to support the rail.

Preferably in the closed position the first end of the flexible wall portion is located on a first side of the post and the second end of the flexible wall portion is located on a second opposite side of the post.

Preferably the first and second ends each include transverse end portions extending outwardly from a first side surface of the intermediate portion, the transverse end portions defining end surfaces such that the first and second end portions include first and second protrusions respectively extending outwardly from the end surfaces.

In a preferred embodiment, arcuate surfaces are provided adjacent the first and second end portions such that the arcuate surfaces extend between the first side surface of the intermediate portion and the transverse end portions such that the arcuate surfaces engage against the outer surface of the post in use.

Preferably the flexible wall portion is formed from a relatively thin sheet of flexible material.

Preferably when the intermediate portion is wrapped around the post, the end surface at a first end of the intermediate portion is adjacent and coplanar with the end surface adjacent the second end of the intermediate portion and the first protrusion is located adjacent the second protrusion such that the first and second protrusions form the connector.

Preferably the second protrusion includes a flexible arm received through an aperture in the first protrusion to secure the first and second protrusions together.

In a preferred embodiment, each of the first and second protrusions comprises a first side wall extending outwardly from the end surface parallel to the intermediate portion, second and third side walls extending from the end surface such that the second and third walls are generally perpendicular to the first side wall and an end wall connecting distal ends of each of the first, second and third side walls.

Preferably the second side walls of the protrusions are oriented horizontally when the bracket is connected to a vertical post and the third side walls are at an angle to the second side walls.

In a preferred embodiment, the second surface of the intermediate portion includes a rib extending between the first and second ends thereof to be received in one of a plurality of circular notches provided at intervals along the length of the post.

Preferably the first side walls of the first and second protrusions include a first groove adjacent the second side wall and a second groove adjacent the third side wall such that either of the first or second grooves engage with ribs within a channel provided within each of the rails.

Preferably the bracket is provided with first and second stoppers each comprising a semi-cylindrical member extending outwardly from a second surface of the intermediate portion adjacent an end thereof, the stoppers being provided to restrict the drawer from sliding outwardly from the rails.

In a preferred embodiment, the semi-cylindrical members extend transversely outwardly from the second surface such that an open side thereof is located on a side adjacent the ends surface of the intermediate portion.

In accordance with a second aspect of the present invention, there is provided a bracket for a shelving system comprising:
a first end portion, an intermediate portion and second end portion, the first end portion being located at a first end of the intermediate portion and the second end portion being located at a second opposite end of the intermediate portion;
wherein the intermediate portion comprises a flexible wall portion being moveable from an open position, in which the flexile wall portion is planar, to a closed position, in which the flexible wall portion is arcuate, such that in the closed position the flexible wall portion can wrap around a portion of a post and the first and second end portions engage to form a connector engagable with an end of a rail for supporting drawers.

BRIEF DESCRIPTION OF THE DRAWINGS

The invention will now be described, by way of example, with reference to the following drawings, in which:

FIG. 4 is a view showing the process of attachment of the bracket to a post of a shelving system;

FIG. 6a is a side cross-sectional view of the bracket attached to the post;

FIG. 6b is a close up view of Detail A of FIG. 6a;

FIG. 11b is a close up of Detail B of FIG. 11a;

FIG. 12b is a close up of detail C of FIG. 12a;

DETAILED DESCRIPTION OF PREFERRED EMBODIMENTS

Figure 1A:
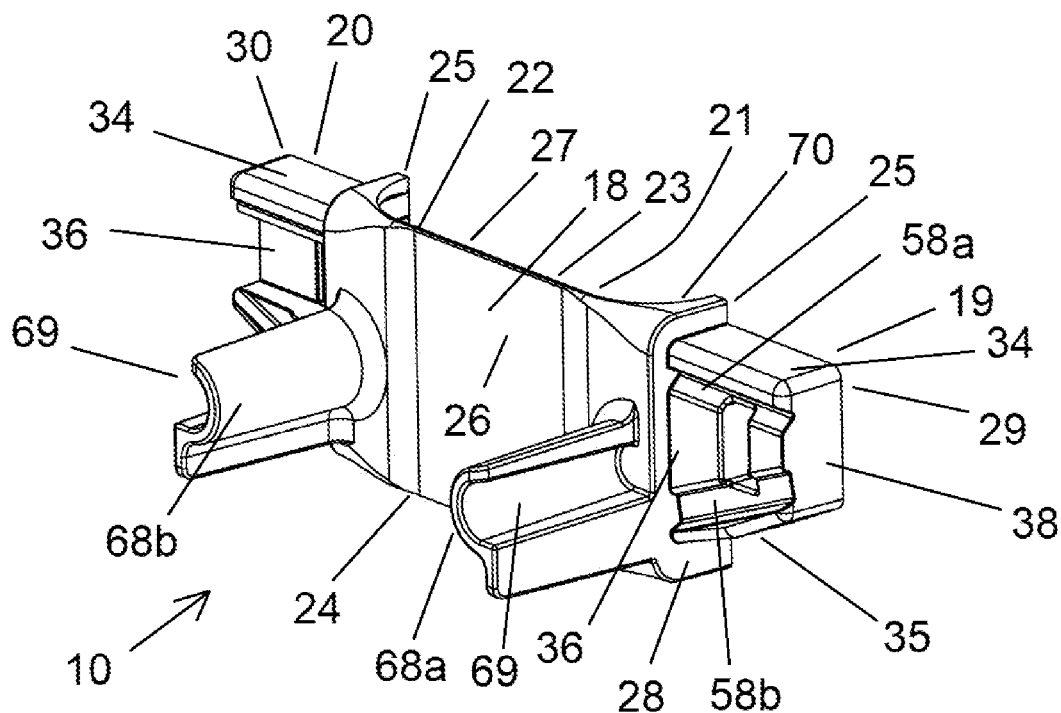
FIG. 1a is an upper perspective view of a bracket of a shelving system in accordance with the present invention in an open configuration.

Referring to the Figures, there is shown a shelving system 11 incorporating a bracket 10 for supporting drawers 12. The shelving system 11 comprises a frame formed by a plurality of posts 14. The posts 14 are arranged vertically at the corners of the shelving system 11 such that the drawers 12 are supported between a set of four of the posts 14. The shelving system 11 may also incorporate shelves (not shown) supported between the sets of posts 14 in a known manner.

Each of the drawers 12 is to be supported between a pair of adjacent rails 16. Each of the rails 16 extends between an adjacent pair of the posts 14 and includes a means to engage an adjacent side of the drawer 12 such that the drawer 12 can slide along the length of the rail 16. The drawer 12 can therefore slide between a stored position (as shown in the drawings) and an extended position in which the drawer 12 moves outwardly away from a front pair of the posts 14.

Figure 1B:
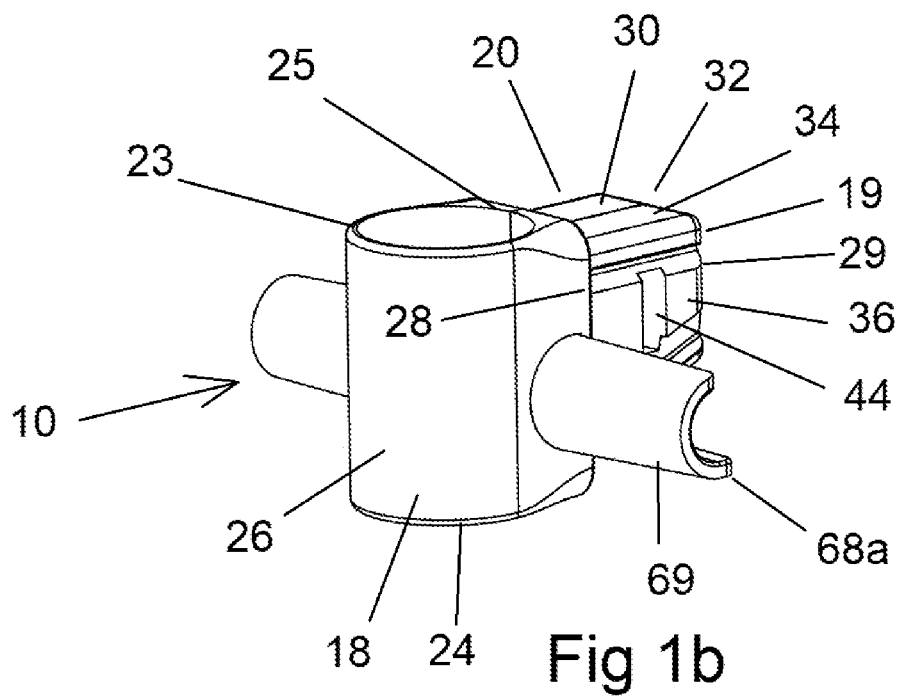
FIG. 1b is an upper perspective view of the bracket of FIG. 1a in a closed configuration.
Figure 2A:
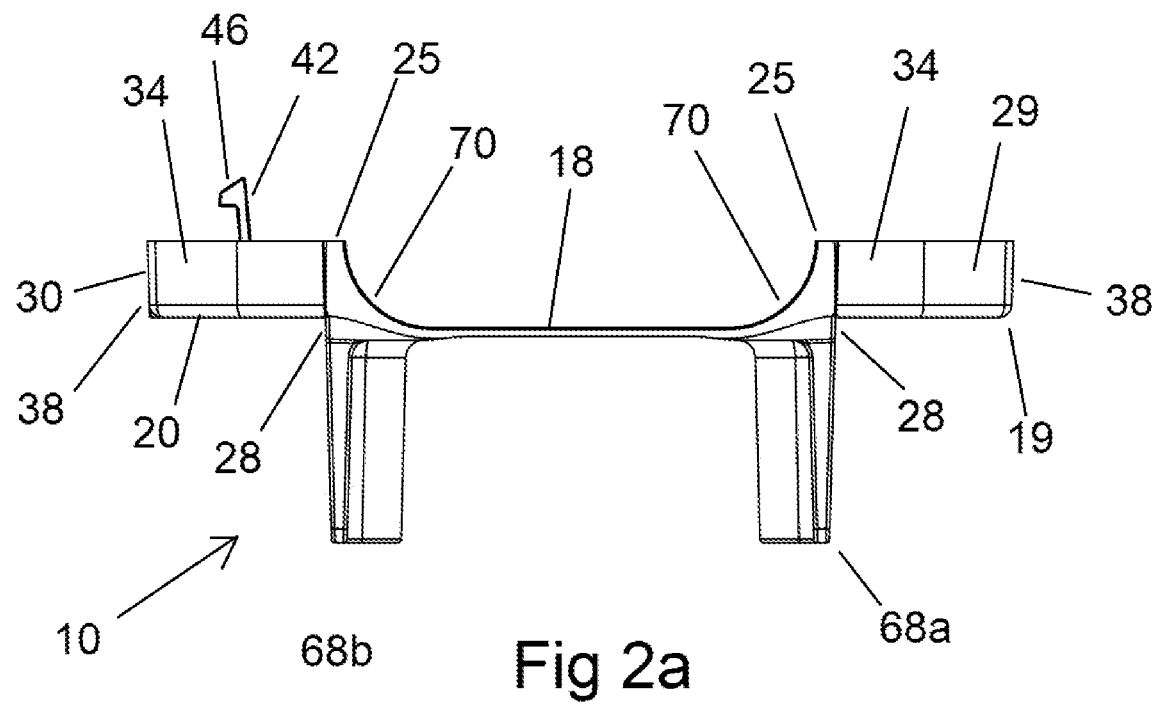
FIG. 2a is a top view of the bracket of FIG. 1 in the open configuration.
Figure 2B:
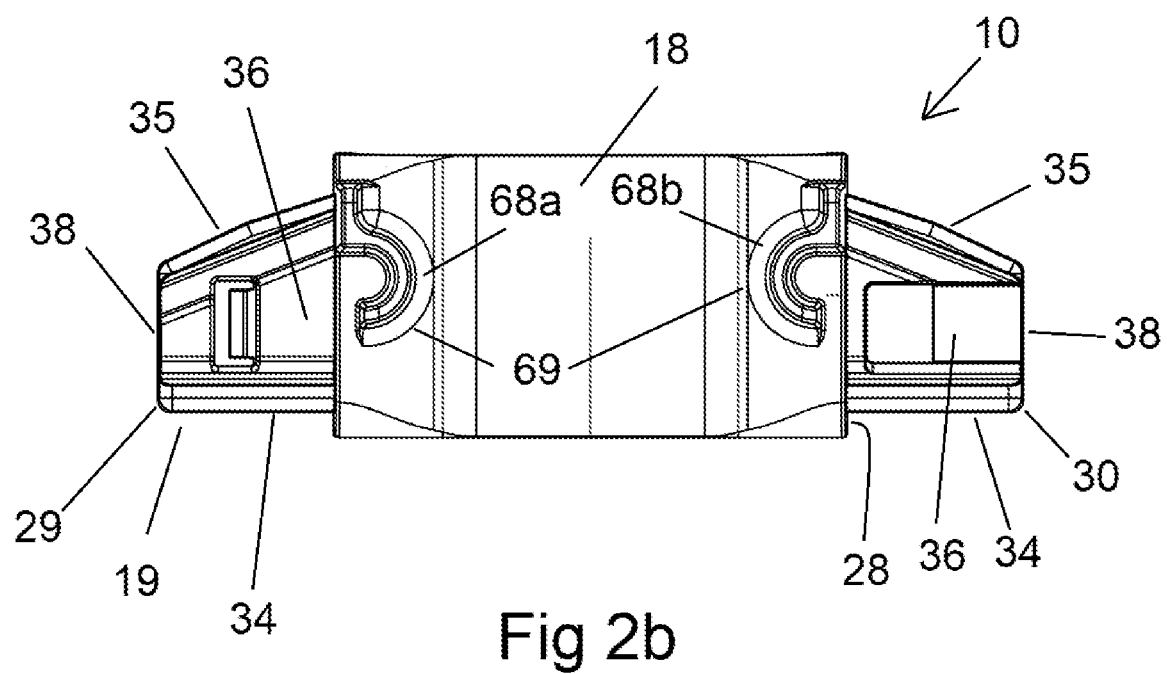
FIG. 2b is a front view of the bracket of FIG. 1 in the open configuration.
Figure 3A:
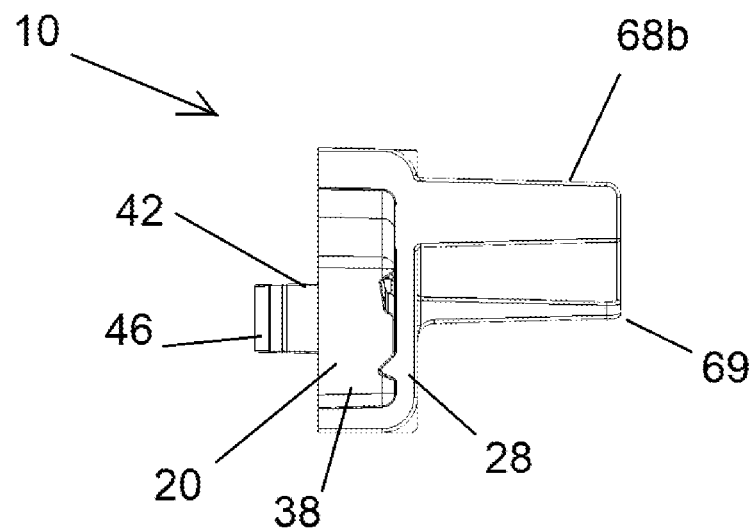
FIG. 3a is a side view of the bracket of FIG. 1 in the open configuration.
Figure 3B:
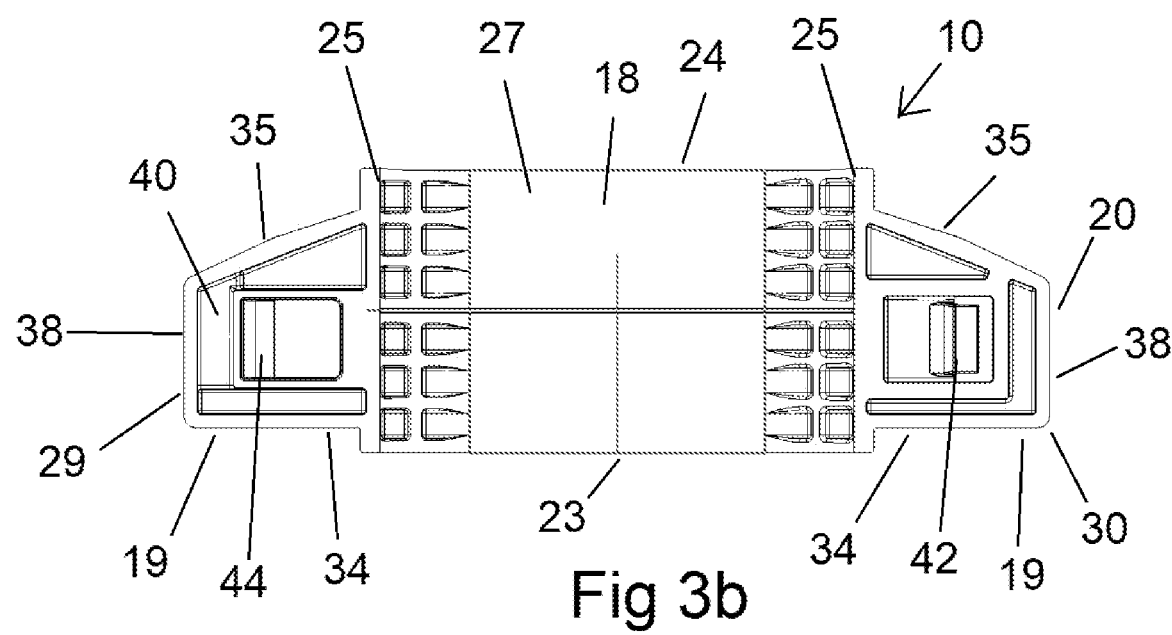
FIG. 3b is a rear view of the bracket of FIG. 1 in the open configuration.
Figure 5A:
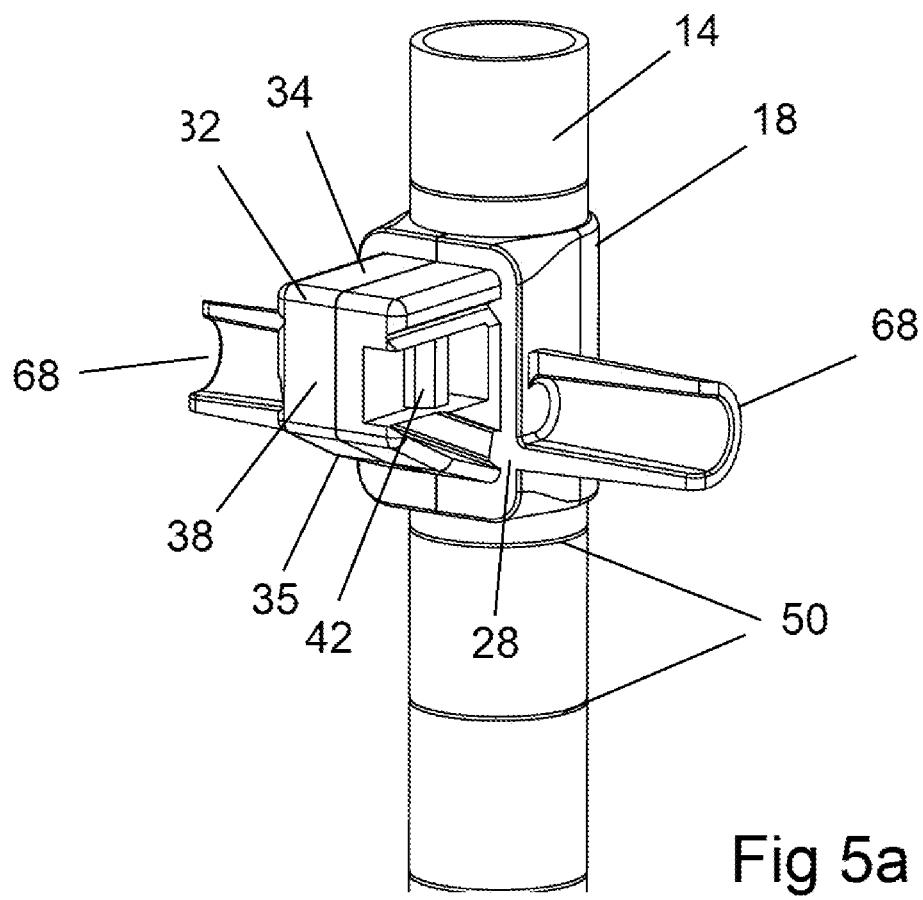
FIG. 5a is an upper perspective view of the bracket attached to the post.
Figure 5B:
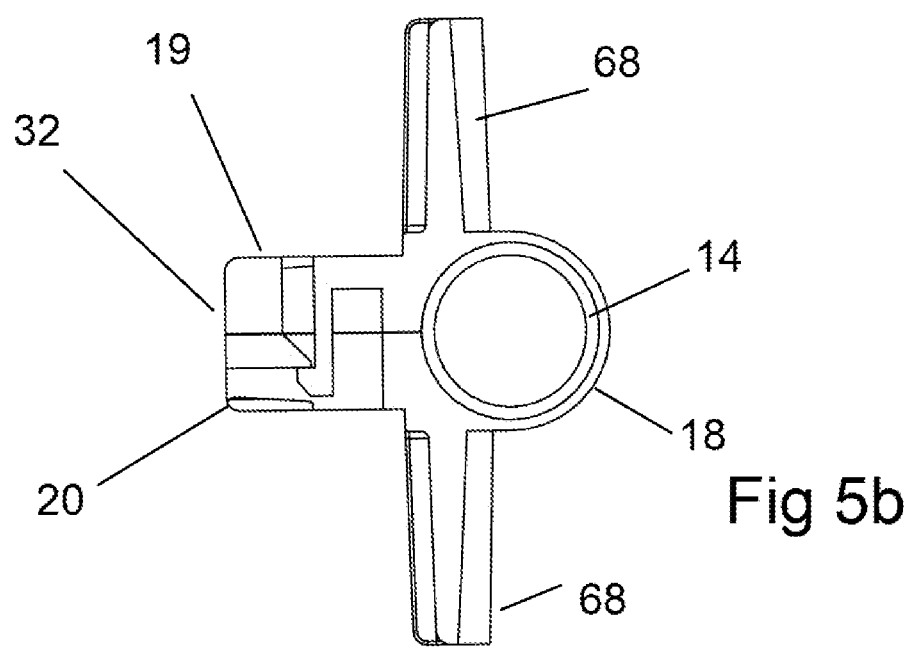
FIG. 5b is a top view of the bracket attached to the post.

Each of the brackets 10 comprises generally a first end portion 19, a second end portion 20 and an intermediate portion 18. The intermediate portion 18 comprises a flexible wall portion such that the bracket 10 can flex between an open configuration (as shown in FIG. 1a) in which the intermediate portion 18 is general linear and the end portions 19 and 20 are at opposed ends of the bracket 10, and a closed configuration (as shown in FIG. 1b) in which the intermediate portion 18 is curved such that the first and second end portions 19 and 20 are adjacent each other.

The flexible wall portion of the intermediate portion 18 is formed from a relatively thin sheet of a suitably flexible material, such as a plastic based material. The intermediate portion 18 includes first and second ends 21 and 22 and first and the second longitudinal sides 23 and 24. In the embodiment shown, the intermediate portion 18 is rectangular in shape.

The first and second ends portions 19 and 20 each include transverse end portions 25 located at first and second ends 21 and 22 of the intermediate portion 18. The intermediate portion 18 includes also first and second side surfaces 27 and 26. The transverse end portions 25 extend outwardly from the first side surface 27 of the intermediate portion 18. The transverse end portions 25 define end surfaces 28 at ends thereof. The first and second end portions 19 and 20 include first and second protrusions 29 and 30 respectively, extending outwardly from the end surfaces.

The bracket 10 is provided with arcuate surfaces 70 on the first and second end portions 19 and 20. The arcuate surfaces 70 are provided extending between the first side surface 27 of the intermediate portion 18 and the transverse end portions 25 such that the arcuate surfaces 70 engage against the outer surface of the post 14 in use.

The intermediate portion 18 of the bracket 10 is sufficiently flexible such that it can be wrapped around a portion of the post 14 as shown in FIG. 4. The length of the intermediate portion 18 is such that a first end of the intermediate portion 18 is located in use on a first side of the post 14 and the second end of the intermediate portion 18 is located on a second opposite side of the post 14. That is, the flexible wall portion of the intermediate portion 18 wraps around generally one half of the post 14. The arcuate surfaces 70 engage with the surface of the post 14 on a second half of the post 14.

When the intermediate portion 18 is wrapped around the post 14, the end surface 28 of the first end portion 19 is adjacent and coplanar with the end surface 28 of the second end portion 20. The first protrusion 29 is thereby located adjacent the second protrusion 30 such that the first and second protrusions 29 and 30 form a connector 32 provided to engage with an end of one of the rails 16.

Each of the first and second protrusions 29 and 30 comprises a first side wall 36 extending outwardly from the end surface 28 of the intermediate portion 18 such that the first side wall 36 is generally parallel to the plane of the intermediate portion 18, when the intermediate portion is in the open position.

The protrusions 29 and 30 include also second and third side walls 34 and 35 extending from the end surface 28 such that the second and third walls are generally perpendicular to the first side wall 36 and connected to the first side wall 36 along opposed edges thereof. An end wall 38 connects distal ends of each of the first, second and third side walls 36, 34 and 35. The first side wall 36 and the end wall 38 are to be oriented vertically in use and the second and third side walls 34 and 35 oriented generally horizontally. The first, second, third and end walls 36, 34, 35 and 38 define a recess 40 in a side of the protrusion 29 and 30.

The first and second protrusions 29 and 30 are securable together by a connection mechanism. In the embodiment shown, the connection mechanism comprises an arm 42 extending outwardly from within the recess 40 of the second protrusion 30. The arm 42 is received through an aperture 44 provided in the first side wall 36 of the first protrusion 29. The arm 42 includes a transverse lug 46 on a distal end thereof. The arm 42 is arranged such that as the first and second protrusions 29 and 30 are moved together, the distal end of the arm 42 is flexed as it is received through the aperture 44 and the lug 46 engages with an edge of the aperture 44 to retain the first and second protrusions 29 and 30 together. When secured together, the second and third side walls 34 and 35 are adjacent and coplanar as are the end walls 38.

As shown in FIG. 6b, the first surface 27 of the intermediate portion 18 includes a rib 48 extending between the first and second ends 21 and 22 thereof. Each of the posts 14 is provided with a plurality of circular notches 50 at intervals along the length thereof. The rib 48 is provided to be received in one of the notches 50 to restrict sliding motion of the bracket 10 relative to the post 14.

Figure 13C:
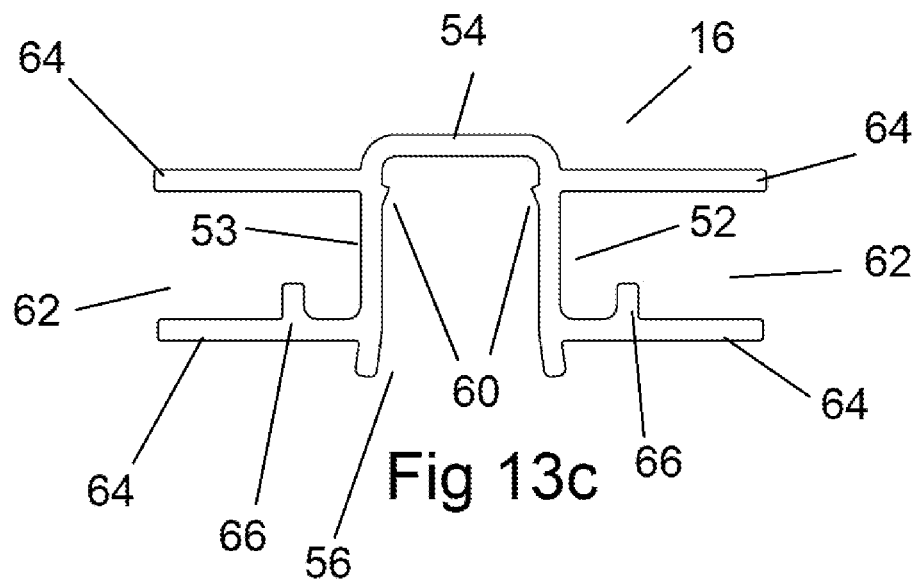
FIG. 13c is an end view of a rail of the shelving system.
Figure 13B:
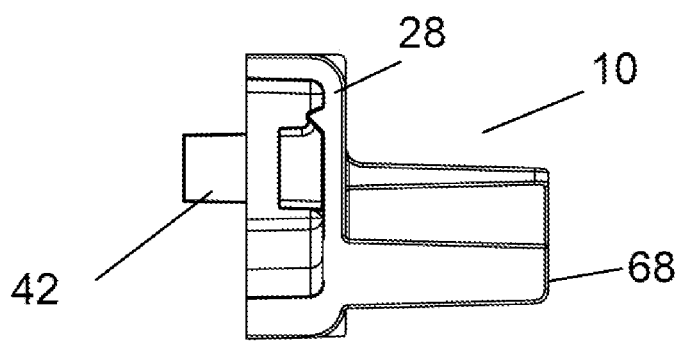
FIG. 13b is a side view of the bracket in the open configuration.
Figure 13A:
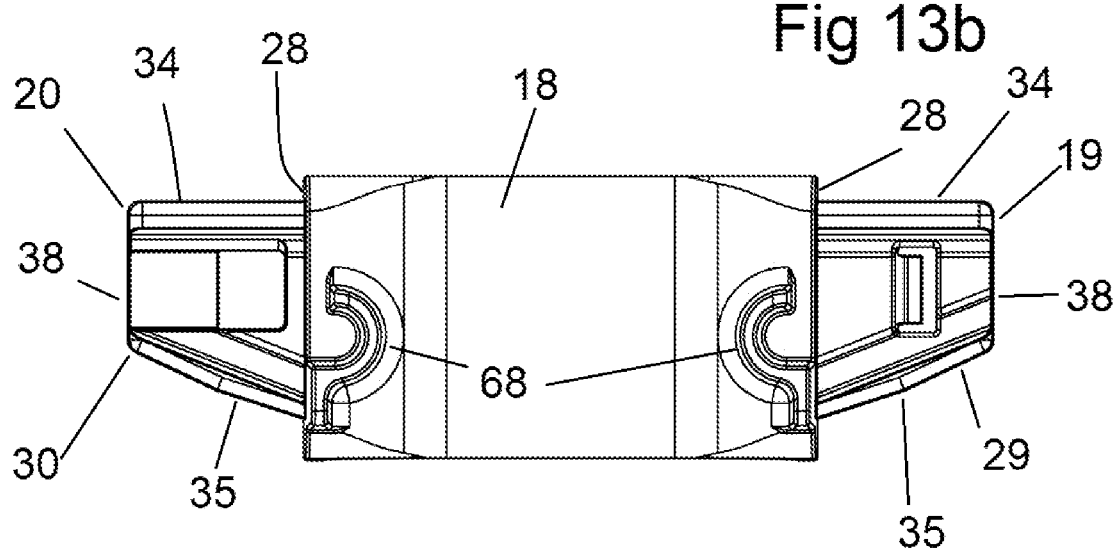
FIG. 13a is a front view of the bracket in the open configuration.

As can be seen in FIG. 13c, each of the rails 16 comprises a central portion having a generally U-shaped cross section. The central portion therefore comprises first and second side wall portions 52 and 53 extending from opposed ends of an intermediate wall portion 54, thereby defining a longitudinal channel 56. The channel 56 is dimensioned such that the connector 32 of the bracket 10 may be received into an end of the channel 56.

Figure 7:
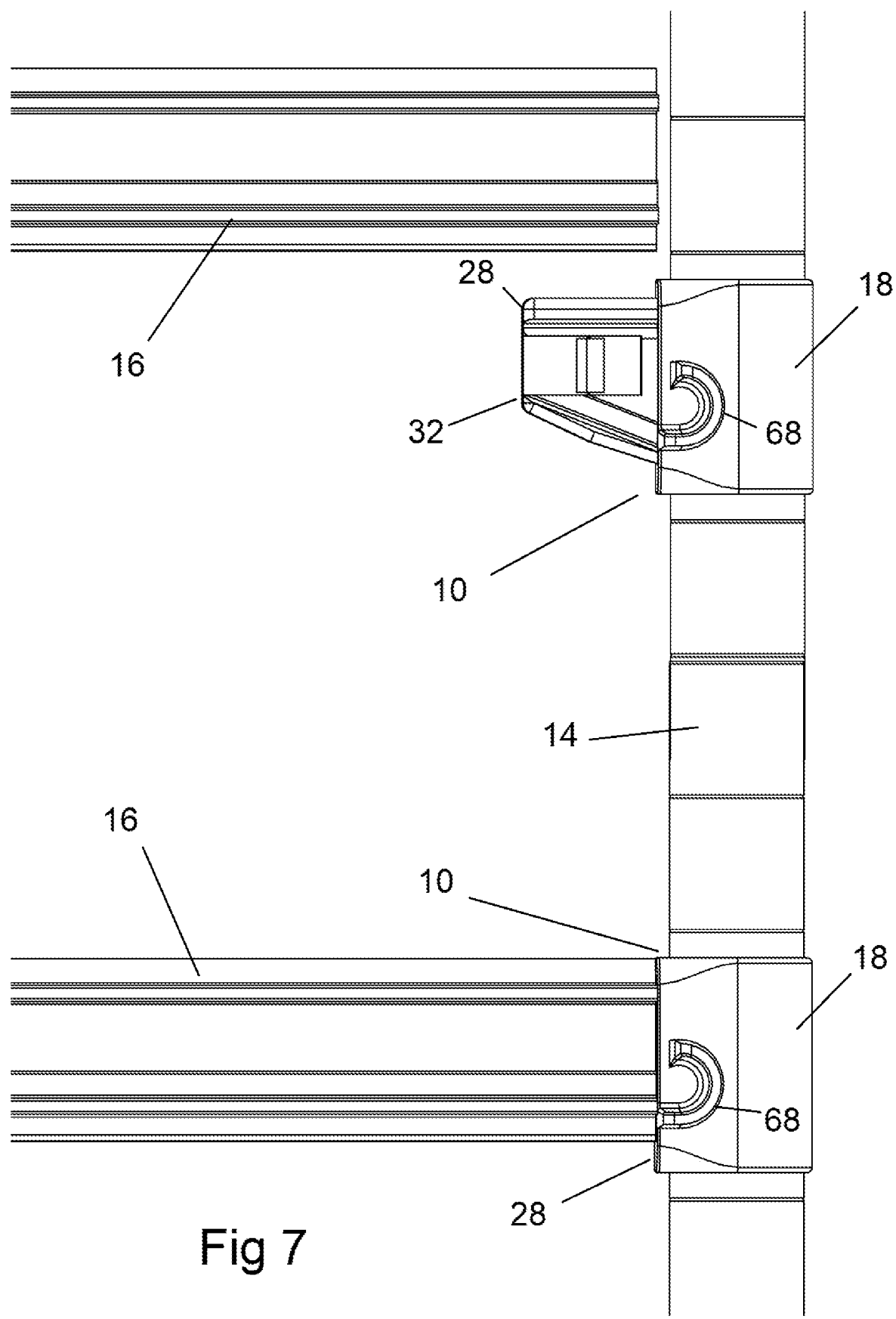
FIG. 7 is a side view showing connection of rails to the brackets.
Figure 8:
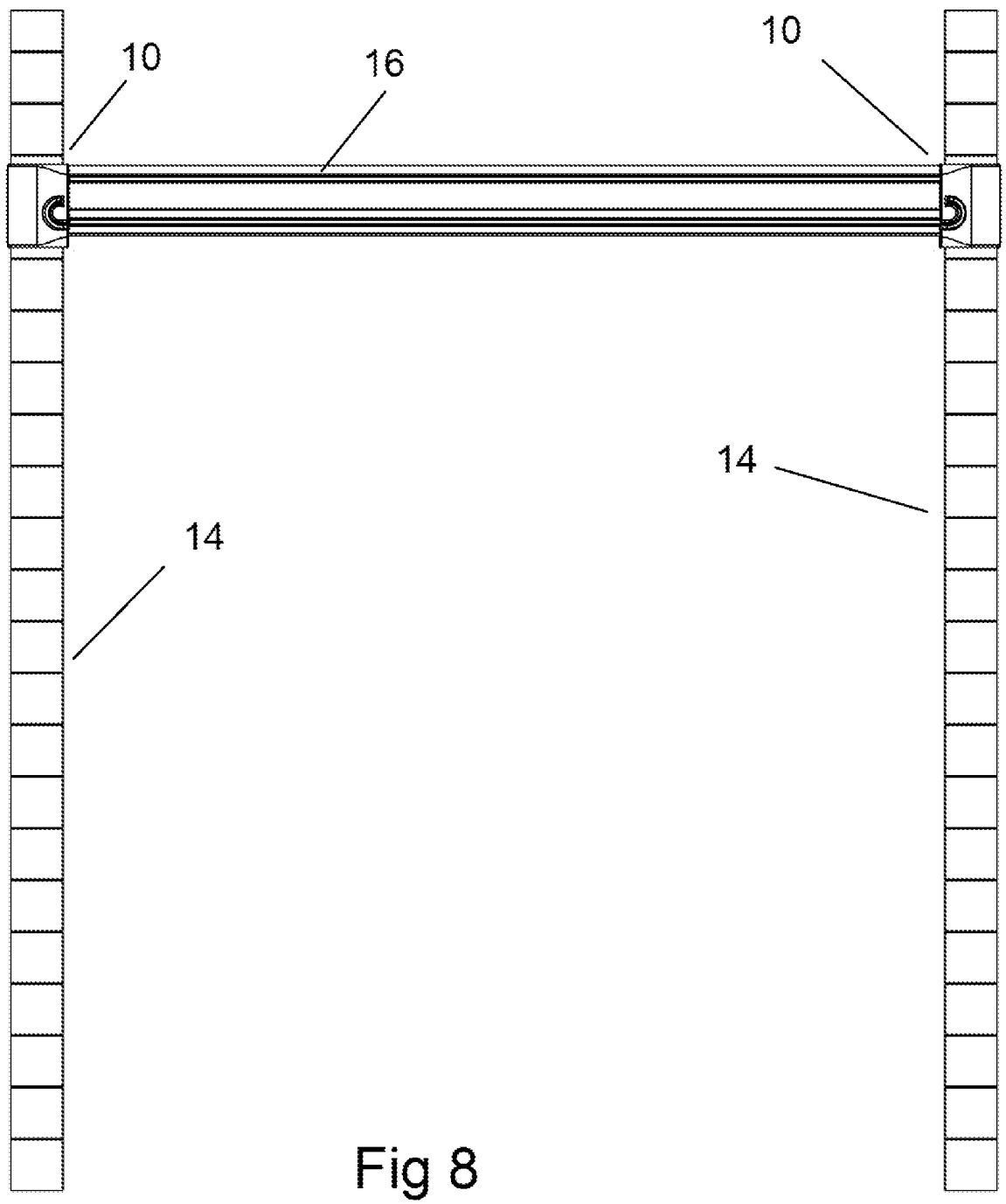
FIG. 8 is a side view showing a rail connected between a pair of brackets.
Figure 9A:
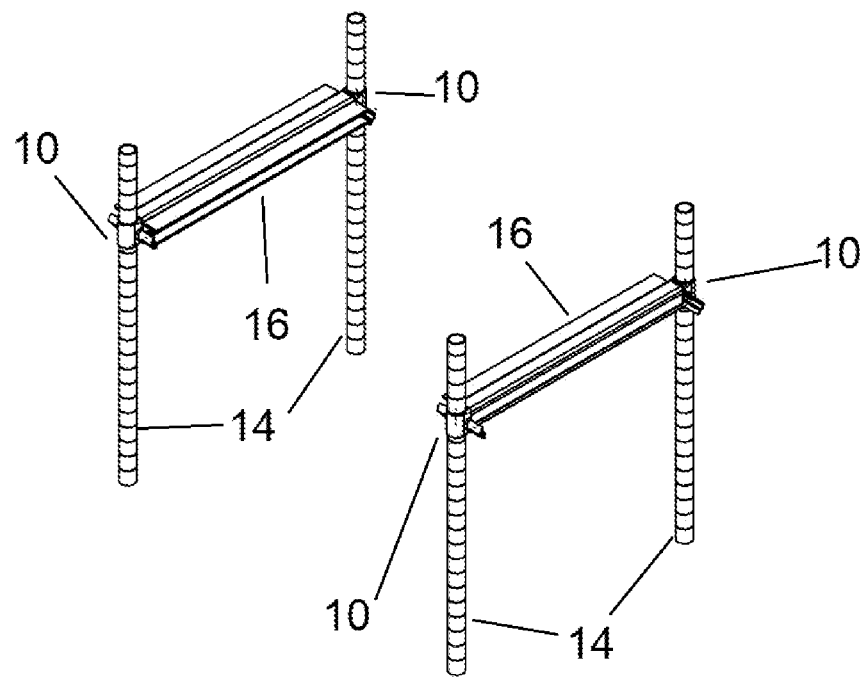
FIG. 9a is an upper perspective view of a pair of rails connected between adjacent pairs of posts.
Figure 9B:
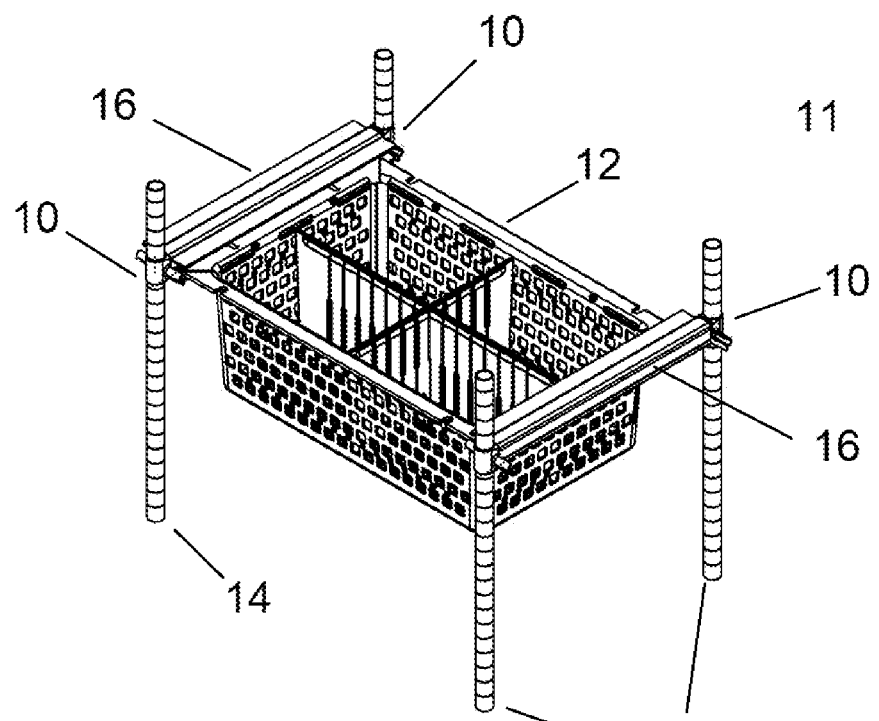
FIG. 9b is an upper perspective view showing a drawer supported between the rails.

When received within the channel 56 in a first orientation (as shown in FIGS. 7 to 9), the intermediate wall portion 54 is located adjacent and above the second side wall 34, the first side wall portion 52 of the rail 16 is adjacent the first side wall 36 of the first protrusion 29 and the second side wall portion 53 is adjacent the first side wall 36 of the second protrusion 30.

The first side walls 36 of the first and second protrusions 29 and 30 each include grooves 58 extending from adjacent the end surfaces 28 to the end walls 38. A first of the grooves 58a is adjacent and parallel to the second side wall 34 and a second of the grooves 58b is adjacent and parallel to the third side wall 35.

As can be seen in FIG. 13c, internal surfaces of the first and second side wall portions 52 and 53 of the rail 16 are provided with a rib 60 along the length thereof. The ribs 60 engage into the first grooves 58a or the second grooves 58b to locate the rail 16 relative to the connector 32.

Figure 10A:
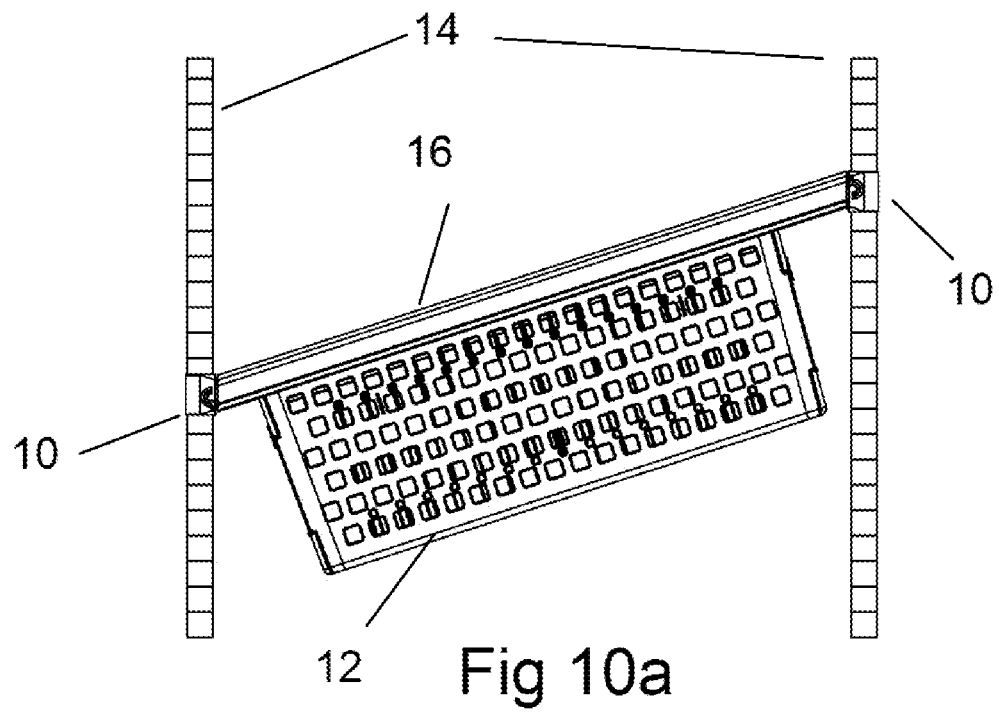
FIG. 10a is a side view showing the rails and drawer supported at an angle.
Figure 10B:
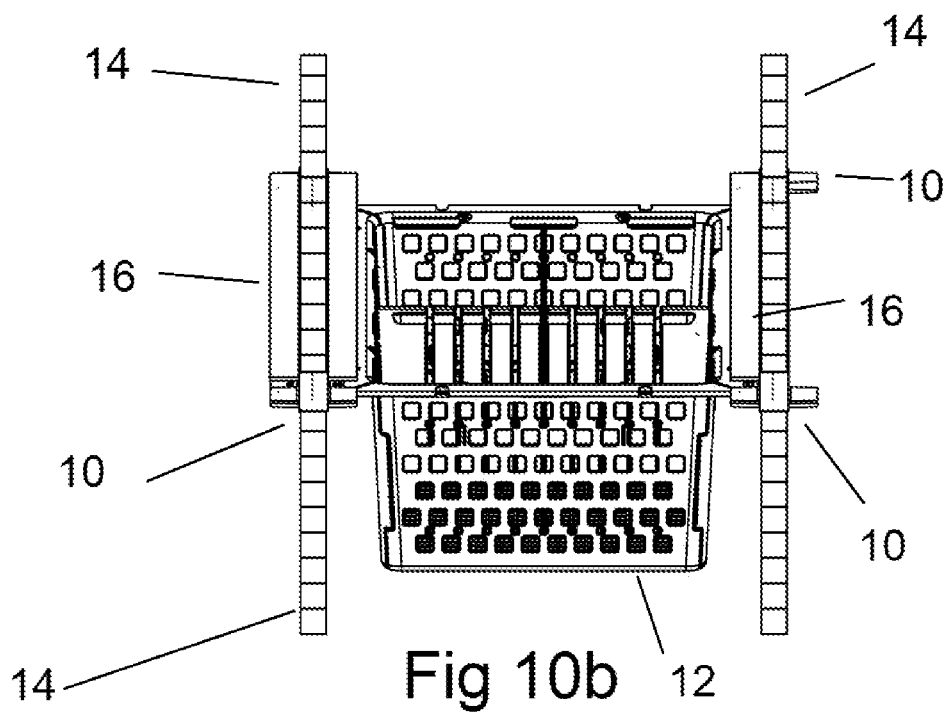
FIG. 10b is a front view showing the rails and drawer supported at an angle.
Figure 11B:
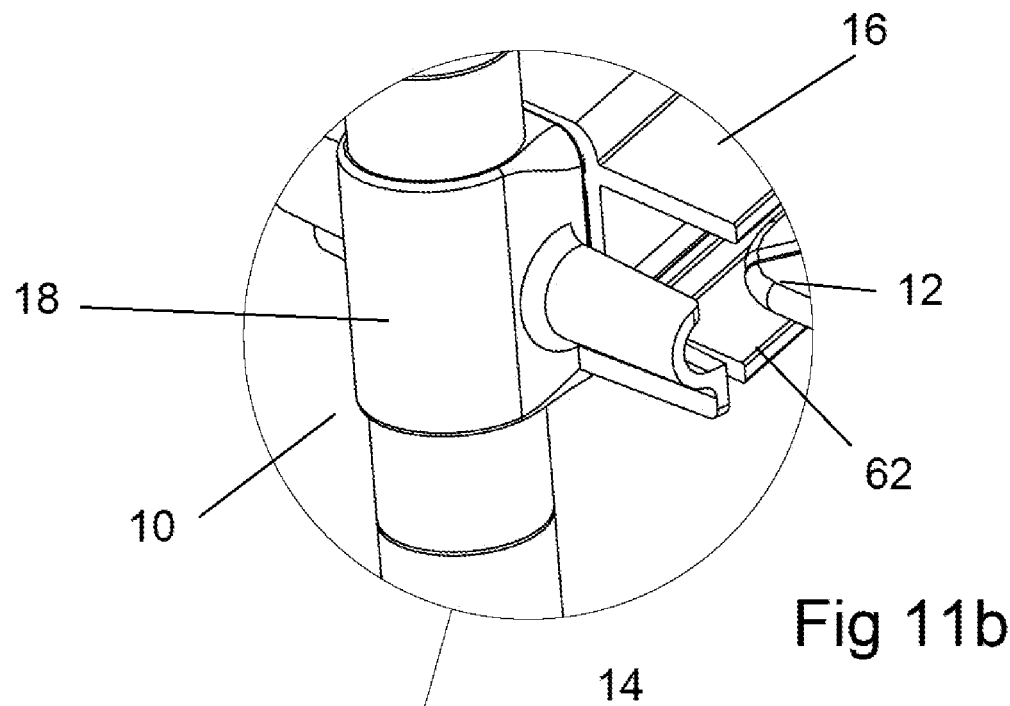
Figure 11A:
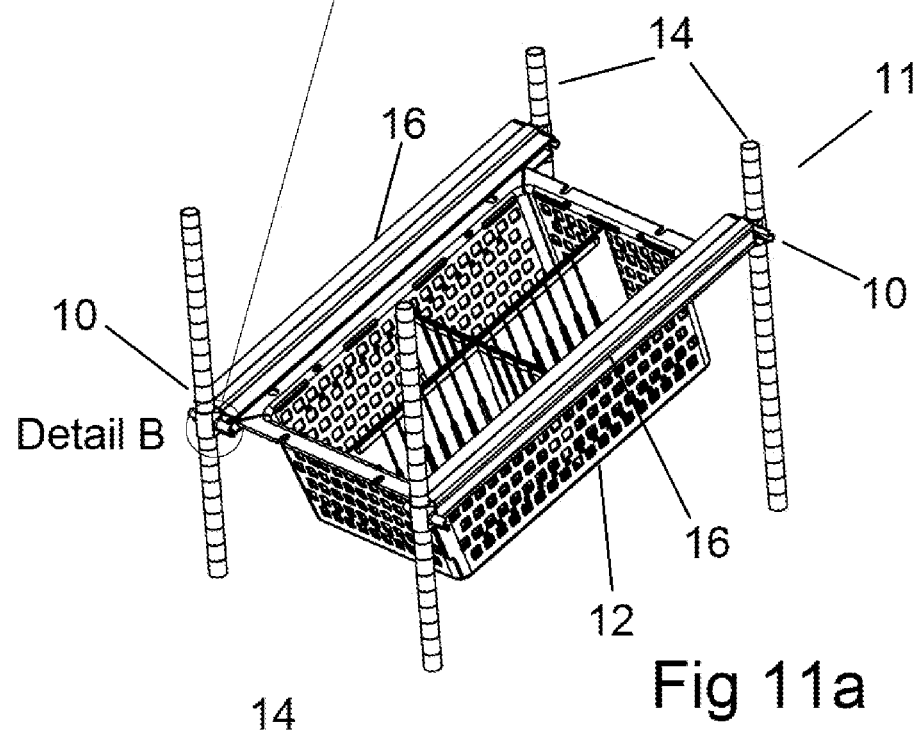
FIG. 11a is an upper perspective view showing the rails and drawer supported at an angle.
Figure 12B:
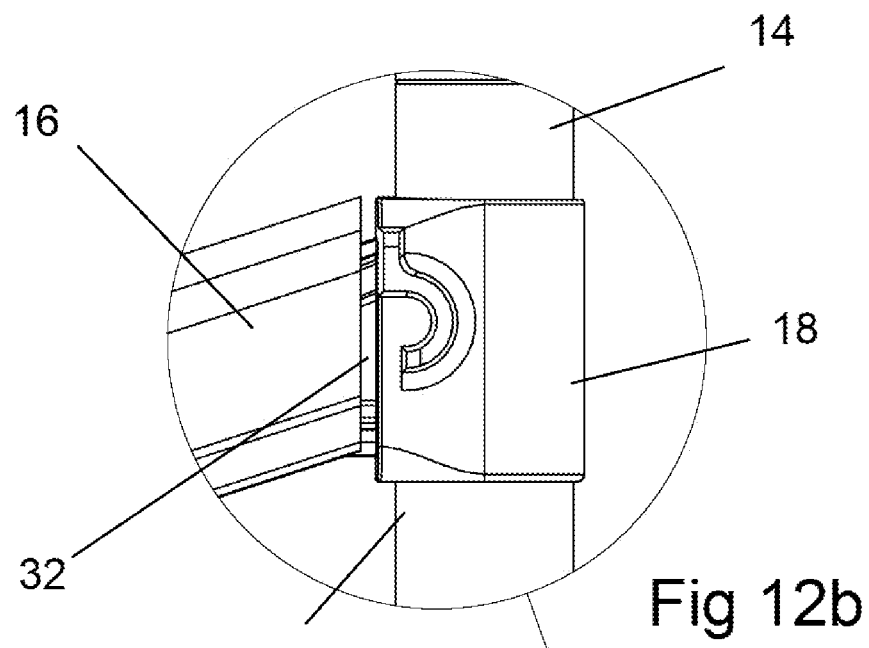
Figure 12A:
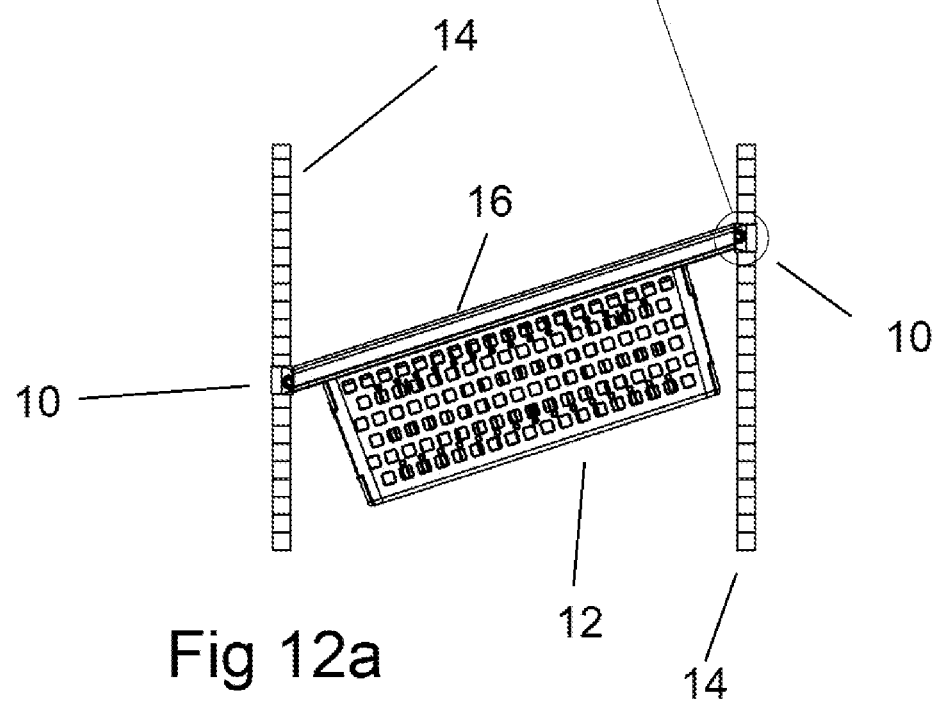
FIG. 12a is a side view showing the rails and drawer supported at an angle.

The third side walls 35 of the first and second protrusions 29 and 30 are angled relative to the second side walls 34. As can be seen in FIGS. 10 to 12, the brackets 10 on adjacent pairs of posts 14 may be secured at different heights and the rails 16 engaged with the brackets 10 at an angle to the horizontal by engagement of the intermediate wall portions 54 of the rail 16 resting on the angled third side walls 35 of the brackets 10. This arrangement allows the drawer 12 to be tilted, thereby allowing the contents of the drawer to be more easily visible.

Figure 14A:
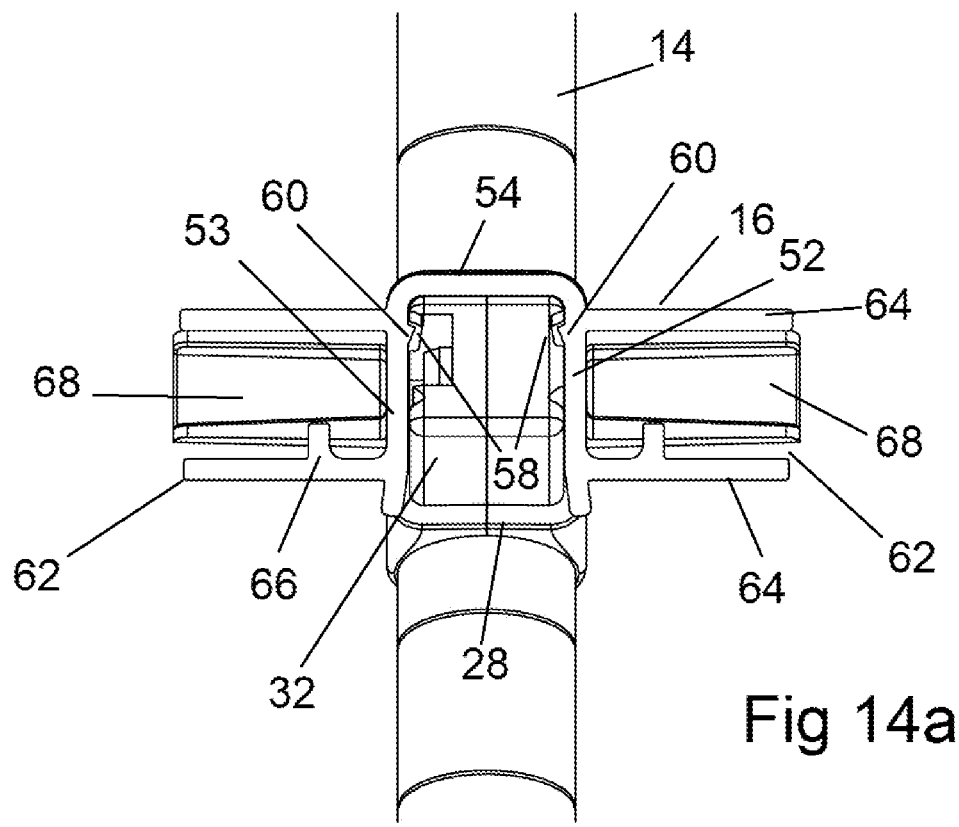
FIG. 14a is a view of the bracket of the present invention supporting a rail having tracks for supporting drawers on both sides of the rail.
Figure 14B:
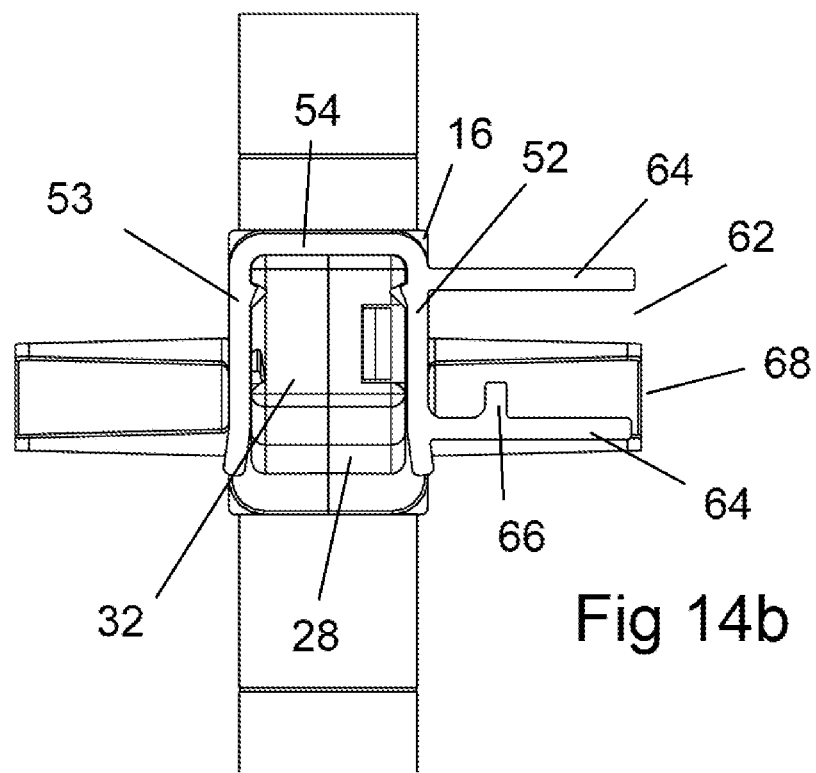
FIG. 14b is a view of the bracket supporting a rail having a single track for supporting a drawer on one side of the rail only.

Each of the rails 16 is provided with one or more tracks 62 for receiving a side rail provided along a side of the drawer 12. The tracks 62 extend outwardly from the first or second side wall portions 52 and 53 of the rail 16. The tracks 62 comprise parallel track walls 64 extending perpendicularly from the side wall portions 52 and 53. In the embodiment of FIG. 14a, a pair of tracks 62 is provided extending from both of the first and second side wall portions 52 and 53. Such a rail 16 allows connection of drawers 12 on either side of the rail 16. FIG. 14b shows an alternative rail 16 having a single track 62 extending outwardly from only the first side wall portion 52. Such a rail 16 may be used when a drawer 12 is required only on a single side of the rail 16.

The tracks 62 are provided with a transverse wall portion 66 extending upwardly from a lower of the track walls 64 (As can be seen in FIG. 13c). The transverse wall portions 66 are provided to engage with an edge of the side rail of the drawer 12 to prevent the side of the drawer 12 moving outwardly from the track 62.

The bracket 10 is provided also with first and second stoppers 68. The stoppers 68 are provided to engage with a front edge of the drawer 12 to restrict the drawer 12 from moving to the extended position. In the embodiment shown, each of the stoppers 68 comprises a semi-cylindrical member 69 extending outwardly from the second surface 26 of the end portions 19 and 20. A first of the stoppers 68a is located adjacent a first end of intermediate portion 18 and a second of the stoppers 68b is located adjacent a second end of the intermediate portion 18. The semi-cylindrical members 69 extend transversely outwardly from the second surface 26 such that an open side thereof is located on a side adjacent the ends surface 28.

In use, a forward edge of the drawer 12 is received within the semi-cylindrical member 69 to prevent movement of the drawer 12 to the extended position. When it is required to move the drawer 12 to the extended position, the drawer 12 is lifted up slightly such that the side rail of the drawer 12 rides above the semi-cylindrical member 69.

It will be readily apparent to persons skilled in the relevant arts that various modifications and improvements may be made to the foregoing embodiments, in addition to those already described, without departing from the basic inventive concepts of the present invention.

What is claimed is:

1. A shelving system comprising:
   a frame comprising a plurality of posts;
   a plurality of rails for supporting sides of drawers such that the drawers are slidable along the rails; and
   brackets, each comprising a first end portion, an intermediate portion and second end portion, the first end portion being located at a first end of the intermediate portion and the second end portion being located at a second opposite end of the intermediate portion;
   wherein the intermediate portion comprises a flexible wall portion being moveable from an open position, in which the flexible wall portion is planar, to a closed position, in which the flexible wall portion is arcuate, such that in the closed position the flexible wall portion wraps around a portion of the post and the first and second end portions engage to form a connector engagable with an end of one of the rails to support the rail.

2. The shelving system in accordance with claim 1, wherein in the closed position, the first end of the flexible wall portion is located on a first side of the post and the second end of the flexible wall portion is located on a second opposite side of the post.

3. The shelving system in accordance with claim 1, wherein the flexible wall portion is formed from a relatively thin sheet of flexible material.

4. The shelving system in accordance with claim 1, wherein the bracket is provided with first and second stoppers each comprising a semi-cylindrical member extending outwardly from a second surface of the intermediate portion adjacent an end thereof, the stoppers being provided to restrict the drawer from sliding outwardly from the rails.

5. The shelving system in accordance with claim 4, wherein the semi-cylindrical members extend transversely outwardly from the second surface such that an open side thereof is located on a side adjacent the ends surface of the intermediate portion.

6. The shelving system in accordance with claim 1, wherein the first and second ends each include transverse end portions extending outwardly from a first side surface of the intermediate portion, the transverse end portions defining end surfaces such that the first and second end portions include first and second protrusions respectively extending outwardly from the end surfaces.

7. The shelving system in accordance with claim 6, wherein arcuate surfaces are provided adjacent the first and second end portions such that the arcuate surfaces extend between the first side surface of the intermediate portion and the transverse end portions such that the arcuate surfaces engage against the outer surface of the post in use.

8. The shelving system in accordance with claim 6, wherein when the intermediate portion is wrapped around the post, the end surface at a first end of the intermediate portion is adjacent and coplanar with the end surface adjacent the second end of the intermediate portion and the first protrusion is located adjacent the second protrusion such that the first and second protrusions form the connector.

9. The shelving system in accordance with claim 8, wherein the second protrusion includes a flexible arm received through an aperture in the first protrusion to secure the first and second protrusions together.

10. The shelving system in accordance with claim 6, wherein each of the first and second protrusions comprises a first side wall extending outwardly from the end surface parallel to the intermediate portion, second and third side walls extending from the end surface such that the second and third walls are generally perpendicular to the first side wall and an end wall connecting distal ends of each of the first, second and third side walls.

11. The shelving system in accordance with claim 10, wherein the second side walls of the protrusions are oriented horizontally when the bracket is connected to a vertical post and the third side walls are at an angle to the second side walls.

12. The shelving system in accordance with claim 11, wherein the second surface of the intermediate portion includes a rib extending between the first and second ends thereof to be received in one of a plurality of circular notches provided at intervals along a length of the post.

13. The shelving system in accordance with claim 12, wherein the first side walls of the first and second protrusions include a first groove adjacent the second side wall and a second groove adjacent the third side wall such that either of the first or second grooves engage with ribs within a channel provided within each of the rails.

14. A bracket for a shelving system comprising:
a first end portion, an intermediate portion and second end portion, the first end portion being located at a first end of the intermediate portion and the second end portion being located at a second opposite end of the intermediate portion;
wherein the intermediate portion comprises a flexible wall portion being moveable from an open position, in which the flexible wall portion is planar, to a closed position, in which the flexible wall portion is arcuate, such that in the closed position the flexible wall portion can wrap around a portion of a post and the first and second end portions engage to form a connector engagable with an end of a rail for supporting drawers.

15. The bracket in accordance with claim 14, wherein in the closed position the first end of the flexible wall portion is located on a first side of the post and the second end of the flexible wall portion is located on a second opposite side of the post.

16. The bracket in accordance with claim 14, wherein the flexible wall portion is formed from a relatively thin sheet of flexible material.

17. The bracket in accordance with claim 14, wherein the bracket is provided with first and second stoppers each comprising a semi-cylindrical member extending outwardly from a second surface of the intermediate portion adjacent an end thereof, the stoppers being provided to restrict the drawer from sliding outwardly from the rails.

18. The bracket in accordance with claim 17, wherein the semi-cylindrical members extend transversely outwardly from the second surface such that an open side thereof is located on a side adjacent the ends surface of the intermediate portion.

19. The bracket in accordance with claim 14, wherein the first and second ends each include transverse end portions extending outwardly from a first side surface of the intermediate portion, the transverse end portions defining end surfaces such that the first and second end portions include first and second protrusions respectively extending outwardly from the end surfaces.

20. The bracket in accordance with claim 19, wherein arcuate surfaces are provided adjacent the first and second end portions such that the arcuate surfaces extend between the first side surface of the intermediate portion and the transverse end portions such that the arcuate surfaces engage against the outer surface of the post in use.

21. The bracket in accordance with claim 19, wherein when the intermediate portion is wrapped around the post, the end surface at a first end of the intermediate portion is adjacent and coplanar with the end surface adjacent the second end of the intermediate portion and the first protrusion is located adjacent the second protrusion such that the first and second protrusions form the connector.

22. The bracket in accordance with claim 21, wherein the second protrusion includes a flexible arm received through an aperture in the first protrusion to secure the first and second protrusions together.

23. The bracket in accordance with claim 19, wherein each of the first and second protrusions comprises a first side wall extending outwardly from the end surface parallel to the intermediate portion, second and third side walls extending from the end surface such that the second and third walls are generally perpendicular to the first side wall and an end wall connecting distal ends of each of the first, second and third side walls.

24. The bracket in accordance with claim 23, wherein the second side walls of the protrusions are oriented horizontally when the bracket is connected to a vertical post and the third side walls are at an angle to the second side walls.

25. The bracket in accordance with claim 24, wherein the second surface of the intermediate portion includes a rib extending between the first and second ends thereof to be received in one of a plurality of circular notches provided at intervals along a length of the post.

26. The bracket in accordance with claim 25, wherein the first side walls of the first and second protrusions include a first groove adjacent the second side wall and a second groove adjacent the third side wall such that either of the first or second grooves engage with ribs within a channel provided within each of the rails.

* * * * *